Figure 1:
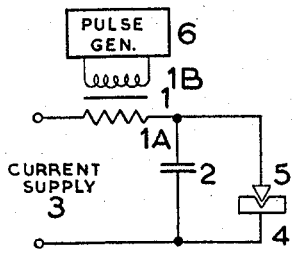

March 3, 1959　　　G. FEFER ET AL　　　2,876,386
ELECTRIC DISINTEGRATION OF CONDUCTIVE MATERIALS
Filed April 9, 1957　　　　　　　　　　　　2 Sheets-Sheet 1

Inventors
GREGORY FEFER
DAGOBERT WILLIAM RUDORFF
by MICHAEL GEOFFREY SEED

Shoemaker & Mattare

Attorneys

March 3, 1959 G. FEFER ET AL 2,876,386
ELECTRIC DISINTEGRATION OF CONDUCTIVE MATERIALS
Filed April 9, 1957 2 Sheets-Sheet 2

Inventors
GREGORY FEFER
DAGOBERT WILLIAM RUDORFF
by MICHAEL GEOFFREY SEED
Shoemaker & Mattare
Attorneys

United States Patent Office 2,876,386
Patented Mar. 3, 1959

2,876,386

ELECTRIC DISINTEGRATION OF CONDUCTIVE MATERIALS

Gregory Fefer, Newnham on Severn, Dagobert William Rudorff, London, and Michael Geoffrey Seed, Sevenoaks, England, assignors to Sparcatron Limited, Bath, England, a body corporate of Great Britain Application April 9, 1957, Serial No. 651,636

5 Claims. (Cl. 315—170)

This invention relates to the electric disintegration of conductive materials with more especial reference to spark discharge electro-erosion processes and apparatus for performing operations on workpieces of hard metals such as steels, stainless steels and carbides.

Apparatus for carrying out such disintegration, for instance as described in Specification No. 2,526,423, in one form includes a condenser connected across an electrode and workpiece and also to a charging circuit such that the condenser is repeatedly charged and produces repeated spark discharges between the electrode and workpiece.

The principal object of the present invention is to provide improved arrangements for repeated pulse discharges in such spark discharge electro-erosion apparatus so as to obtain more effective discharge at the spark gap.

Broadly stated, apparatus according to the present invention for cutting or shaping a workpiece by repeated pulse discharges includes at least one semiconductor element, the charge carrier current of which is modulated to produce time-spaced electrical discharges between workpiece and electrode.

Semi-conductor elements known as transistors can be used for switching operations. In operation and application, the transistor which may be of the point contact or of the junction type somewhat resembles a thermionic tube but is different from the thermionic tube in several fundamental characteristics. In the thermionic tube electrons are liberated by thermionic emission and their movement towards the anode plate electrode constitutes the current flow.

In point contact type and junction type so called "holes" (or deficit electrons) and excess electrons are injected into the solid body of a semi-conductor and their movement through the material of the transistor constitutes a flow which can be modulated by a signal voltage.

There is a fundamental difference between a thermionic tube and transistor of the aforementioned type from the aspect of control. In the thermionic tube the electron current is modulated electrostatically by a signal voltage and under ordinary circumstances no significant signal current is required. But in the transistor signal current is required to modulate the injection of carriers into the semi-conductor in order to modulate the carrier current. The thermionic tube therefore is a voltage-actuated high impedance device, while the transistor is a low impedance current-actuated device.

Semi-conductors may also be of the magneto resistance type which differ from those of the transistor type inasmuch that carrier current is modulated under the influence of a magnetic field. The action of the magnetic field, applied normal to the path of the current carriers, effectively deflects the carriers in a direction normal to their path and to the applied field. Thus current flow takes place through a restricted cross-sectional area of the crystal, thereby presenting a higher resistance to this flow. Consequently the resistance of the element may be varied by suitably varying the applied magnetic field.

Where a charging circuit is used this may also include or have associated with it, a time-delay or pulse forming network to regulate the pulse repetition and render the transistors non-conducting during the periods of condenser discharge across the spark gap.

The supply source may be alternating current or direct current and in the former case the circuit may include also unidirectional conductors or rectifiers.

The invention will be further described with reference to the accompanying drawings where Figures 1 to 13 are circuit diagrams of different arrangements.

Referring now to the drawings in Figure 1, by way of example, there is shown a circuit according to the invention and numeral 1a indicates a magneto resistance element of a magneto resistance unit 1 which is connected in series circuit with an energy storage device which for convenience is shown as condenser 2, and a source of current 3. The work-piece electrode 4 is connected to the terminal of the condenser 2 which is also connected to the supply 3, whilst the tool electrode 5 is connected to the other terminal of the condenser 2. The excitation winding 1b of the magneto-resistance unit 1, is connected to a suitable pulse generator. The circuit is so arranged that the magneto resistance unit controls the charging of the condenser 2, which is subsequently discharged across the gap between the workpiece electrode 4 and the tool electrode 5.

Figure 2:
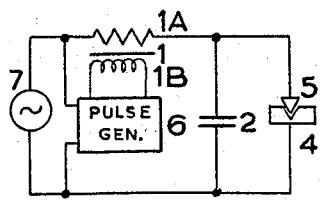

In Figure 2, the current supply 3 is replaced by an alternating current supply 7, whilst the pulse generator 6 also derives a triggering signal from this supply. The magneto resistance unit may either be an electrically symmetric or asymmetric type.

Figure 3:
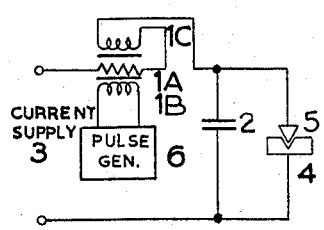

In Figure 3, the circuit in Figure 1 is modified by including in series with the magneto resistance element 1a, an additional excitation winding 1c, the flux of which links with the magneto resistance element 1a in a similar manner as does excitation winding 1b, so as to provide a feedback into the magneto resistance unit 1 dependent upon the supply current.

Figure 4:
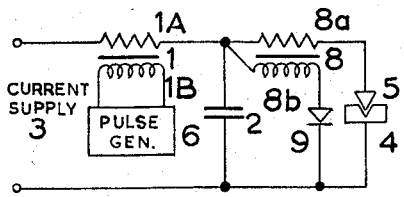

In Figure 4, the circuit in Figure 1 is modified by including an additional resistance element 8a of a magneto resistance unit 8 in series with discharge circuit comprising condenser 2 and the spark gap between workpiece electrode 4 and tool electrode 5. The excitation winding 8b is connected in series with an asymmetric couple 9 across the terminals of the condenser 2, so as to alter the resistance of the magneto resistance element 8a when the voltage across the condenser 2 changes its polarity with respect to its polarity during its main discharge.

Figure 5:
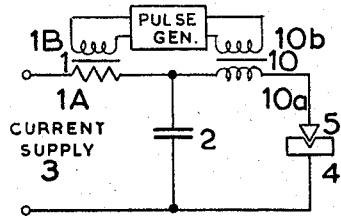

Figure 5 shows a circuit similar to Figure 1 modified by including the primary winding 10a of a transformer 10 in series with the aforementioned discharge circuit. The secondary winding 10b of the transformer 10 is connected to the pulse generator 6, to provide a triggering input dependent upon current in the discharge circuit.

Figure 6:
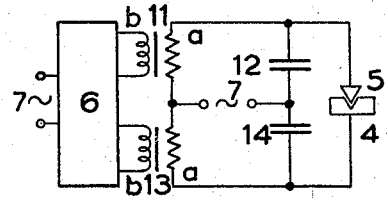

In Figure 6, a magneto resistance element 11a of a magneto resistance unit 11 is connected in series with a condenser 12 and a source of alternating current supply 7. Similarly a magneto resistance element 13a of a magneto resistance unit 13 is connected in series with a condenser 14 and the alternating current supply 7, so that the magneto resistance element 11a in series with the condenser 12 is in shunt circuit with the magneto resistance element 13a and the condenser 14, while one terminal of each condenser 12 and 14 is connected to the same terminal of the alternating current supply 7. The workpiece electrode 4 is connected to the terminal of condenser 14 which is also connected to the magneto resistance element 13a.

The tool electrode 5 is connected to the terminal of condenser 12 which is also connected to the magneto resistance element 11a. The excitation windings 11b and 13b of the magneto resistance units 11 and 13 respectively are independently connected to the pulse generator which is connected also to the alternating current supply 7, so as to provide a triggering signal. The magneto resistance elements 11a and 13a are caused to be alternately of low and high resistance by means of their excitation windings 11b and 13b respectively, according to the polarity of the alternating current cycle. The circuit is so arranged that when magneto resistance element 11a has a high resistance, magneto resistance element 13a has a low resistance and vice versa, thus causing the circuit to behave as a voltage doubling rectifier circuit inasmuch that a D. C. voltage of approximately twice the peak value of the alternating current wave is impressed across the terminals of condensers 12 and 14 which are connected to the magneto resistance elements.

Figure 7:
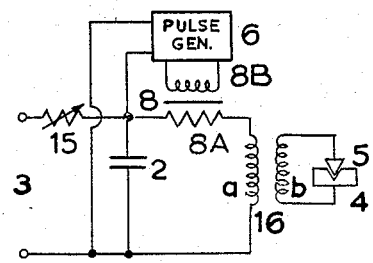

In Figure 7, the condenser 2 is charged by being connected in series with a variable resistance 15 and a source of current 3. A magneto resistance element 8a of a magneto resistance unit 8 is connected in series with the primary winding 16a of a pulse transformer 16 and the condenser 2 so as to provide a discharge path for the condenser 2, the resistance of this path being controlled by the magneto resistance unit. The workpiece electrode 4 is connected to one terminal of the secondary winding 16b of the pulse transformer 16, whilst the tool electrode 5 is connected to the other terminal of the secondary winding 16b. The excitation winding 8b of the magneto resistance unit 8 is connected to the pulse generator 6, which may be connected across the condenser 2 to derive a triggering signal.

Figure 8:
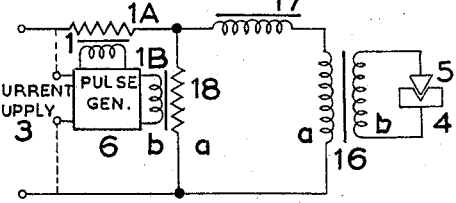

Figure 8 shows the magneto resistance element 1a of a magneto resistance unit 1, connected in series circuit with an inductive energy storage device denoted as inductance 17, the primary winding 16a of the pulse transformer 16, and a source of current supply 3. The workpiece electrode 4 is connected to one terminal of the secondary winding 16b of the pulse transformer 16, whilst the tool electrode 5 is connected to the other terminal of the secondary winding 16b. The excitation winding 1b of the magneto resistance unit 1 is connected to the pulse generator, which may be connected to the source of current supply 3 in order to obtain a triggering signal. A magneto resistance element 18a of a magneto resistance unit 18 is connected in shunt circuit with the inductance 17 and primary winding 16a to provide a discharge path for the inductance. The excitation winding 18b of the magneto-resistance unit 18 is connected to the pulse generator 6. The circuit is so arranged that the magneto resistance unit 1 controls the charging of the inductive storage device, inductance 17, whilst the magneto resistance unit 18 serves to discharge the energy stored in the inductance 17 through the primary winding 16a of the pulse transformer 16, this energy being transmitted into the circuit comprising the workpiece electrode 4, the tool electrode 5 and the secondary winding 16b.

Figure 9:
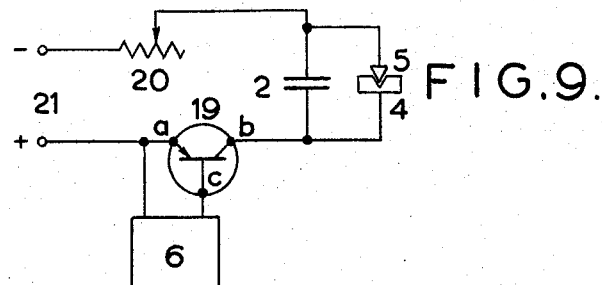

Referring now to Figure 9, the collector electrode 19b and emitter electrode 19a of a transistor 19, shown as a "p-n-p" type, are connected to a series circuit comprising a condenser 2 in series with a variable resistance 20 and direct current supply 21, in such a way that the collector electrode is connected to one terminal of the condenser 2 while the emitter electrode is connected to the positive terminal of the direct current supply 21. The workpiece electrode 4 is connected to the terminal of the condenser 2 which is also connected to the collector electrode 19b of the transistor 19 whilst the tool electrode 5 is connected to the other terminal of condenser 2. The emitter electrode 19a and the base electrode 19c of the transistor 19 are connected to the output of the pulse generator 6. The transistor connections are thus made in what is termed as a "common emitter" connection. The circuit is so arranged that the charging of condenser 2 from the direct current supply 21 is controlled by variation of the effective impedance between the collector electrode 19b and emitter electrode 19a of the transistor 19, this impedance being in turn controlled by the current flowing from the emitter electrode 19a to the base electrode 16c, this current being regulated by the pulse generator 6.

Figure 10:
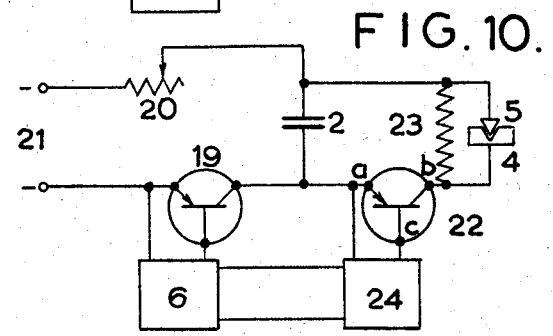

In Figure 10, the circuit in Figure 9 is modified to include an additional transistor 22 in series with condenser 2 and the gap between the workpiece electrode 4 and the tool electrode 5 so as to provide a means of controlling the discharge circuit impedance. The emitter electrode 22a is connected to the terminal of condenser 2 which is also connected to the collector electrode 19b of transistor 19, whilst the collector electrode 22b is connected to the workpiece electrode 4. The variation of impedance between the emitter electrode 22a and collector electrode 22b is controlled by the current flow between the emitter electrode 22a and the base electrode 22c, these two electrodes being connected to pulse generator 6 via a time delay network 24 to obtain a control current supply. A resistor 23 is connected across the gap between the workpiece electrode 4 and the tool electrode 5, in order to provide a connection from the terminal of condenser 2 connected to the tool electrode 5, to the collector electrode 22b, before the discharge takes place between the tool electrode 5 and the workpiece electrode 4.

Figure 11:
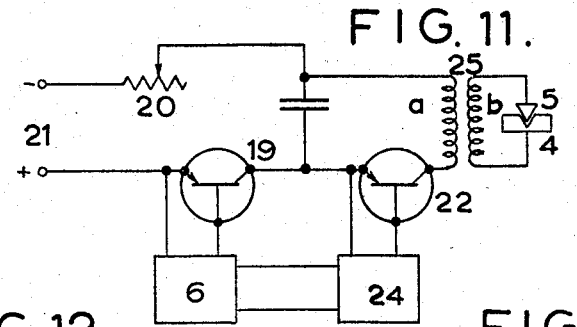

In Fig. 11, the circuit in Figure 10 is further modified by replacing the resistor 23 by a pulse transformer 25, in such a way that the primary winding 25a of the pulse transformer 25 is connected in series circuit with condenser 2 and transistor 22. The secondary winding 25b is connected across the gap between the workpiece electrode 4 and the tool electrode 5. The circuit is so arranged that energy stored in condenser 2 is discharged through the primary winding 25a, and part thereof is transmitted by means of the action of the pulse transformer 25 into the discharge circuit comprising the secondary winding 25b and the gap between the workpiece electrode 4 and the tool electrode 5.

Figures 12, 13:
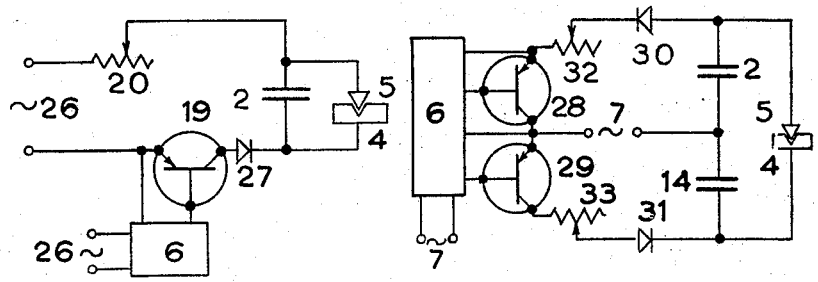

Figure 12 shows the circuit in Figure 1 modified by replacing the direct current supply 21 by an alternating current supply 26, and by placing an asymmetric couple 27 in series circuit with the condenser 2, the transistor 19, the variable resistance 20 and the alternating current supply 26. The asymmetric current should permit forward current flow in such a way that it flows from the emitter electrode 19a of transistor 19 to the collector electrode 19b. The pulse generator 6 may also be connected to the alternating current supply 26, to obtain a synchronized trigger input signal. The circuit is so arranged that the charging of condenser 2 may be controlled by the action of transistor 19 during the half cycle of alternating current flow in the circuit determined by the asymmetric couple 27.

In Figure 13, a condenser 12 is connected in series circuit with a transistor 28, an asymmetric couple 30, a variable resistance 32, and an alternating current supply 7. Similarly, a condenser 14 is connected in series circuit with a transistor 29, an asymmetric couple 31, a variable resistance 33, and the same alternating current supply 7. The circuit is so connected that the collector electrode 28b of transistor 28, and the emitter electrode 29a of transistor 29 are both connected to the one terminal of the alternating current supply. The emitter electrode 28a of transistor 28 is connected to one terminal of the variable resistance 32, whilst the collector electrode 29b of transistor 29 is connected to one terminal of the variable resistance 33. One terminal of condenser 12 and one terminal of condenser 14 are connected to the other terminal of the alternating current supply. The workpiece electrode 4 is connected to the terminal of condenser 14, which is connected to the asymmetric couple 31, whilst the tool electrode is connected to the terminal of condenser 12 which is connected to asymmetric couple 30. The charging of condenser 12 is controlled by transistor 28 during the half wave of the alternating current flow permitted by the forward characteristic of the asymmetric couple 30. Transistor 28 is in turn controlled by the current flow from the emitter electrode 28a to the base electrode 28c of transistor 28, this being effected by connecting the latter two electrodes to the pulse generator 6, which obtains a synchronized trigger signal input from the alternating current supply 7. Similarly in charging condenser 14 during the other half of the alternating current supply is controlled by transistor 29, which in turn is controlled by the current flow from the emitter electrode 29a to the base electrode 29c, this also being effected by connecting the latter two electrodes to the pulse generator 6. The circuit behaves as a controlled "voltage doubler" circuit, inasmuch that twice the peak value of the alternating current wave is impressed across the terminals of the condensers connected to the workpiece electrode 4 and the tool electrode 5 respectively.

The operation of the arrangement shown diagrammatically in Figure 1 is as follows:—Consider action of the circuit at the instant of connection to the current supply 3 which for the sake of simplicity may be considered as a direct current supply. Current will flow through the magneto resistance element 1a and the condenser 2 in such a way as to charge the condenser with a polarity according to the polarity of the supply. With the value of the magneto resistance element constant the voltage across the condenser will rise exponentially as a function of the time until an electrical breakdown on the gap between the work piece electrode 4 and the tool electrode 5 occurs and the energy stored in the condenser is discharged across this gap. When the discharge is completed after a relatively short period compared with the charging period, the cycle repeats itself. In certain cases, however, it is undesirable that the condenser voltage increases exponentially and that a pulsed charging of the condenser is more acceptable providing an idle period between the completion of the discharge, and the beginning of charging. This may be effected by the variation of the value of the resistive element during the charging cycle. The initial value of resistance referred to is made relatively large so that the condenser voltage increases negligibly. After the predetermined time, the magneto resistance element is caused to have a substantially low value of resistance causing the condenser to charge rapidly and the condenser voltage to rise quickly to the breakdown value. The initial high resistance is effected by linking the resistive element with a strong magnetic field which is produced by the excitation winding 1b. Thereafter the magnetic field is suddenly reduced causing the resistive element to have a low value until the gap breakdown voltage is attained. The pulsed excitation of the control winding is derived from the pulse generator, which is arranged to provide a constant excitation which is either periodically interrupted for the duration required for the condenser charging, or opposed for that duration by a counter excitation of equal magnitude. In effect the excitation current requires to have a rectangular asymmetric waveform. The change from zero excitation to full excitation is capable of increasing the resistance approximately 100 times thus providing the desired change of charging characteristics.

The operation of the arrangement shown in Figure 9 is basically similar to that described for Figure 1 with the exception that the change of resistance required for pulse charging of condenser 2, is effected by the action of transistor 19. The effective resistance of that part of the transistor connected in the charging circuit, i.e., between the emitter electrode and collector electrode, is controlled by the passage of current from the emitter electrode to the base electrode and is referred to as the base current. The effective resistance has a high value with zero base current, whereas it may be substantially reduced with increase of the latter. The pulse generator 6 therefore generates pulses of base current, during which the condenser 2 rapidly charges to a value of voltage causing breakdown of the gap between the workpiece electrode 4 and the tool electrode 5. The effective resistance is increased when breakdown voltage is attained by termination of the base current pulse. This pulse is repeated only when sufficient time has elapsed since the gap breakdown. The current pulses require to have an asymmetric rectangular waveform, with the pulse occupying the minor period, whereas in Figure 1 these pulses were required to operate during the major period.

The resistance 20 is included to limit the current flowing through the transistor in the event of the discharge gap being short circuited.

What we claim is:

1. Electric disintegration apparatus for cutting or shaping a workpiece by repeated pulse discharges including an energy storing device, at least one semiconductor element, and a modulating circuit which includes or has associated with it a time delay or pulse forming network to control the pulse repetition rate and wherein the semiconductor element is rendered substantially non-conducting during the periods of discharge across the spark gap.

2. Electric disintegration apparatus for cutting or shaping a workpiece by repeated pulse discharges including energy storage means, a semi-conductor element connected in series with said energy storage means, and means for controlling the resistance of said semiconductor element to produce time-spaced electrical discharges between a workpiece and an electrode.

3. Electric disintegration apparatus for cutting or shaping a workpiece by repeated pulse discharges including energy storage means, a semi-conductor element connected to said energy storage means, an excitation winding for controlling the resistance of said semiconductor element, and means for causing pulsed excitation of said excitation winding to produce time-spaced electrical discharges between a workpiece and an electrode.

4. Apparatus as defined in claim 3 wherein said last mentioned means comprises a pulse generator.

5. Electric disintegration apparatus for cutting or shaping a workpiece by repeated pulse discharges between an electrode and a workpiece having a gap therebetween which comprises a storage capacitor connected across said gap, a source of electrical energy connected across said capacitor, a semiconductor element connected in series with said storage capacitor and having an excitation winding, and a pulse generator connected to said excitation winding for causing pulse excitation of said excitation winding to produce time-spaced electrical discharges across said gap.

References Cited in the file of this patent

UNITED STATES PATENTS

| | | |
|---|---|---|
| 2,628,330 | Williams | Feb. 10, 1953 |
| 2,804,575 | Matulaitis | Aug. 27, 1957 |